July 3, 1962  D. M. SCHWARTZ  3,042,169

TRANSMISSION

Filed Dec. 27, 1957  2 Sheets-Sheet 1

INVENTOR
DANIEL M. SCHWARTZ

BY Harold T. Stowell
Harold L. Stowell
ATTORNEY

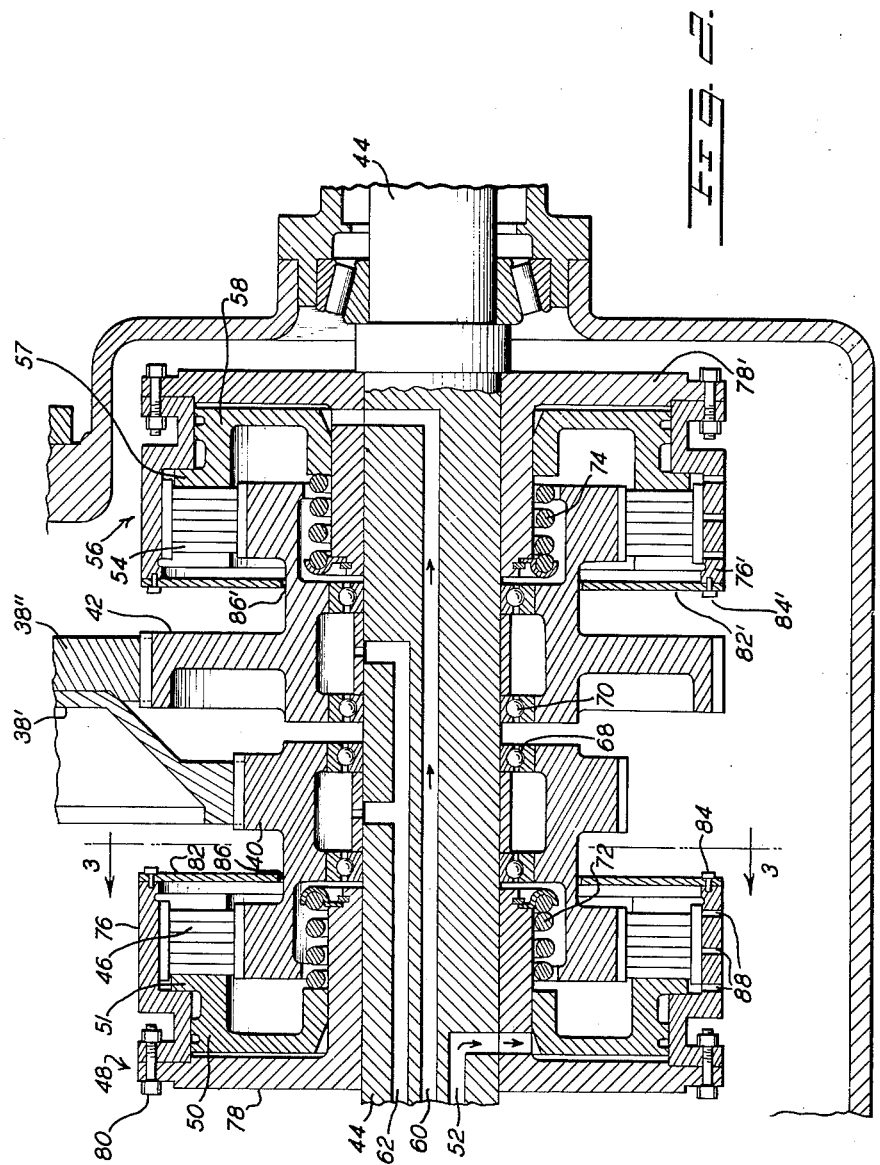

United States Patent Office 3,042,169
Patented July 3, 1962

3,042,169
TRANSMISSION
Daniel M. Schwartz, Salt Lake City, Utah, assignor to The Eimco Corporation, Salt Lake City, Utah, a corporation of Delaware
Filed Dec. 27, 1957, Ser. No. 705,544
1 Claim. (Cl. 192—113)

This invention relates to a new and improved friction type disc clutch and to a transmission utilizing same and, in particular, to a constant mesh change speed transmission having friction clutches for selecting the relative rates of rotation and/or direction of rotation of the input and output shafts thereof.

It is a principal object of the invention to provide a cooperating disc type friction clutch wherein substantially all clutch drag is eliminated when the clutch plates are in the clutch release position.

It is a further object to provide such a clutch and transmission that are relatively simple in construction, rugged and dependable in use, and relatively inexpensive to maintain.

The invention may be defined in general terms as a cooperating disc type friction clutch including first spaced radially extending clutch discs rotatable with a first drive member, second radially extending clutch discs between the first clutch discs, a housing for said first and second clutch discs rotatable with a second drive member, means coupling the second clutch discs to the housing, means for selectively engaging and disengaging said first and second clutch discs to couple the first and second drive members and means cooperating with the clutch housing to maintain the housing substantially oil free; and as a constant mesh transmission including a housing, a power input shaft, a power output shaft, and gears interconnecting the input and output shafts, means releasably securing at least one of said gears to one of said shafts, the means including spaced radially extending clutch discs carried by the said one gear, radially extending clutch discs rotatable with said one shaft and extending between each of the gear carried discs, means for selectively engaging and disengaging the discs secured to the gear and to the shaft, a housing for the clutch discs, means coupling the clutch disc housing to said shaft for rotation therewith, and the means associated with the clutch disc housing for maintaining the clutch discs substantially oil-free.

The invention will be described in detail with reference to the illustrative embodiments showing the improvement applied to a transmission including plural disc type friction clutches for an overhead bucket material handling machine of the type shown and described in United States patent application Serial No. 497,754 filed March 29, 1955, by D. M. Schwartz et al.

Referring to the illustrative embodiments shown in the accompanying drawings in which:

FIG. 2 is an enlarged fragmentary sectional view of the clutch and gear mechanisms shown in FIG. 1 of the drawings.

Figure 1:
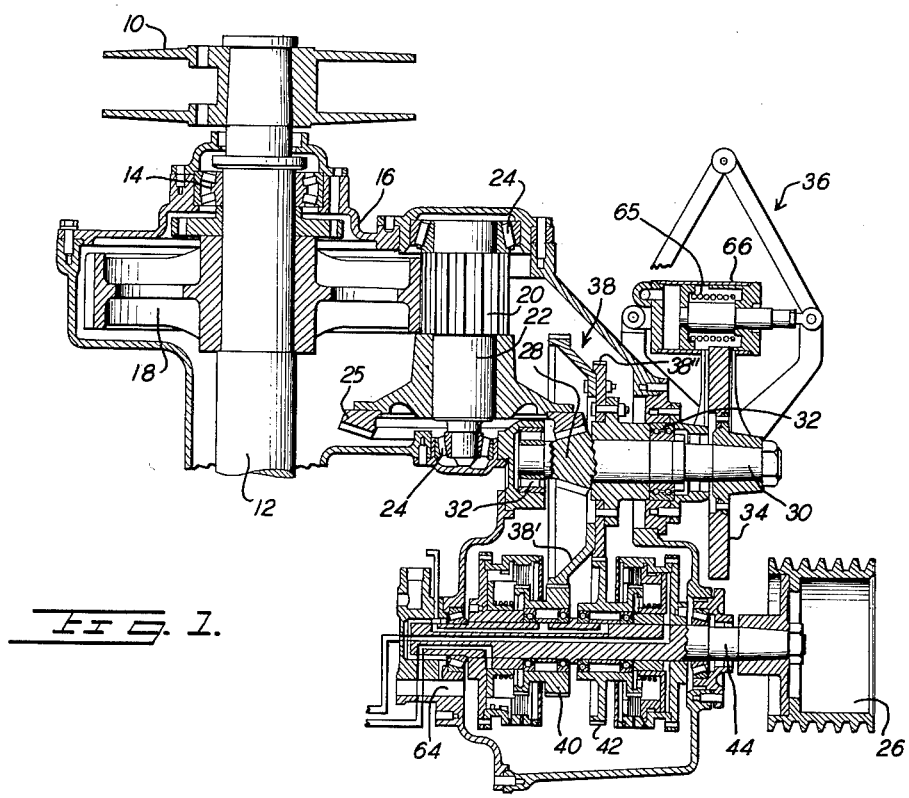
FIG. 1 is a fragmentary sectional view of a two-speed constant mesh transmission for operating a winching device.

Referring to the drawings, a reel 10 of a winching structure is keyed to a cross-shaft 12 for rotation therewith. The cross-shaft 12 is journalled for rotation in bearings 14 carried in a suitable casing generally designated 16. Keyed to the cross-shaft 12 is a large gear wheel 18. The gear 18 is in driving relation to a gear 20 secured to an intermediate shaft 22. The intermediate shaft 22 is journalled in bearings 24 carried by the casing 16. Also rotatable with the intermediate shaft 22 is a bevel gear 25. A pinion gear 28 on shaft 30 engages the bevel gear 25. The pinion shaft is journalled in bearings 32 carried by the casing 16. Keyed to the forward end of the pinion shaft 30 is a brake disc 34 of a brake assembly generally designated 36 for the winching device.

A compound gear 38 having two sets of gear teeth 38' and 38" is keyed to the pinion shaft 30 between the shaft support bearings 32. Gear teeth 38' are in constant mesh with the gear teeth of gear 40 and gear teeth 38" are in constant mesh with the gear teeth of gear 42.

Gears 40 and 42 are rotatably mounted on shaft 44, to the forward end of which is keyed the belt drum 26.

Alternate radially extending clutch discs of multiple disc clutch 46 are secured to and rotate with gear 40. The other discs of clutch 46 are secured to the clutch housing generally designated 48, which housing is keyed to and rotates with shaft 44. Within the clutch housing is a ring-shaped piston 50, spring urged out of engagement with the clutch discs. The rear portion 51 of the piston forms a presser plate for the clutch discs.

Pressure fluid is directed to the head of piston 50 through a conduit 52, a portion of which is provided by an internal passage in the shaft 44. If pressure fluid is directed into conduit 52 in the direction of the arrows, the piston 50 urges the discs of clutch 46 into engagement so that gear 40 will rotate with the clutch housing 48 which is attached to shaft 44.

Alternate radially extending clutch discs of multiple disc clutch 54 are secured to and rotate with gear 42. The other discs of clutch 54 are secured to the clutch housing generally designated 56, which housing is keyed to and rotates with shaft 44. Within the clutch housing 56 is a ring-shaped piston 58 spring urged out of engagement with the clutch discs. The rear portion 57 of the piston forms a presser plate for clutch discs.

Pressure fluid is directed to the head of piston 58 through conduit 60, a portion of which is provided by an internal passage in the shaft 44. If pressure fluid is directed into conduit 60 in the direction of the arrows, the piston 58 urges the discs of clutch 54 into engagement so that gear 42 will rotate with the clutch housing 56 attached to shaft 44.

A third conduit 62, a portion of which is provided by an internal passage in the shaft 44, supplies lubrication for the bearings and gears of the assembly. A pressure fluid return line 64 connects the hydraulic control system and the transmission casing 16 whereby the lubricating and clutch actuating oil are drained from the lowermost portion of the transmission casing. It will be noted with reference to FIG. 1 of the drawings that the lowermost portion of the lubricant outlet or return line 64 from the casing is so positioned with respect to the clutch housings that the clutch housings rotate through the pool of lubricant maintained in the casing.

The brake 34 for the winching device is provided with a brake actuating spring 65 and a cylinder or hydraulic ram 66 which releases the brake when the cylinder is connected to pressure fluid through the control system for actuating the clutches 46 and 54 whereby the operator of the device may selectively rotate the shaft 12 carrying the winch 10 at high or low speeds or the winch may be held in a selected position by the release of pressure fluid from the ram 66 controlling brake 34.

If the winch 10 is to be driven at low speed with the pulley 26 connected by plural V-belts to a prime mover, the shaft 44, the clutch housings 48 and 56 and their attached radially extending clutch discs are continuously rotated. Low speed gear 40 which meshes with gear 38' and high-speed gear 42 which meshes with gear 38" being rotatably mounted by bearings 68 and 70 respectively to shaft 44 do not rotate until the respective discs of clutch 46 or 54 are engaged. By directing pressure fluid through conduit 52 from a suitable control valve, pressure fluid is directed to the rearward end of piston 50 which urges the piston against the compressive force of spring 72 into engagement with the spaced radially extending discs of clutch 46 whereby gear 40 is effectively coupled through the housing 48 to the shaft 44. With the gear 40 coupled to the shaft, power is transmitted through gear 40 to gear 38′, thence to pinion 28 and ring gear 25 secured to shaft 22, thence to gear 20 which meshes with gear 18 secured to shaft 12. The rotation of shaft 12 in turn rotates pulley 10 which is secured to the outboard end of said shaft. Upon the release of the flow of pressure fluid in conduit 52, the piston 50 is urged by spring 72 to a clutch disengaged position.

In order to drive the winch in the high-speed range, pressure fluid is directed into conduit 60 whereby pressure fluid acts against the head of piston 58 which urges the pressure plate 57 formed integrally therewith into engagement with the radially extending discs of clutch 54 against the force of spring 74 whereby gear 42 is effectively coupled by the clutch discs through housing 56 to shaft 44. Upon release of pressure fluid flowing in the conduit 60 the spring 74 returns the piston 58 to the clutch disengaged position.

In the operation of such clutches, it has been found that excess hydraulic fluid for actuating the pistons 50 and 58 and excess lubricant for lubricating the bearings such as 68 and 70 from lubricant conduit 62 and the gears of the transmission from the splash of lubricant maintained in the pool in the bottom portion of the casing cause the clutches 46 and 54 to "drag" or fail to fully release whereby even though both of the pistons 50 and 58 are in the clutch released position, power is transmitted to shaft 12 through the clutches 46 and 54 and their connected housings and gears causing the winch 10 to rotate. Clutch drag is also experienced in the release of oil bath type plural disc friction clutches where oil is employed as a cooling and cushioning means for the clutch plates when the amount of oil is excessive. It has been found that by eliminating the lubricating oil for the bearings and the gears so that substantially no oil ever comes in contact with the clutch discs the annoying drag in the winching device is eliminated. However, it will be apparent to those skilled in the art that it is not possible to operate, over any extended period of time, a transmission without proper lubrication of its bearings and gear elements. It will also be apparent that it is not a practical solution to the problem to remove all oil from oil bath type friction clutches.

Applicant has found that proper lubrication of the transmission may be effected without clutch drag and that a film of oil may be maintained on oil bath type friction clutches which film does not materially reduce the releasability of the clutch by providing a substantially oil-tight housing for the clutches and by providing means whereby clutch actuating fluid or bearing and clutch lubricating oil which may come in contact with the radially extending clutch discs of the clutch is continuously removed from the housing at a rate substantially greater than the rate of entry of such lubricating and clutch actuating oil into the housing.

The substantially oil-tight housing 48 is constructed of an annular member 76 which extends peripherally about the gear carried clutch discs and to which the other clutch discs are mounted. The annular peripherally extending member 76 is secured to the shaft 44 by a radially extending wall member 78 by a plurality of bolts 80 or the annularly extending member 76 and the radial wall 78 could be formed as a single casting. As more clearly shown in FIG. 2 the annular member 76 forming one wall of the clutching housing is provided with a plurality of radially extending bores 88 through which oil entering the clutch housing is ejected by centrifugal force.

Figure 3:
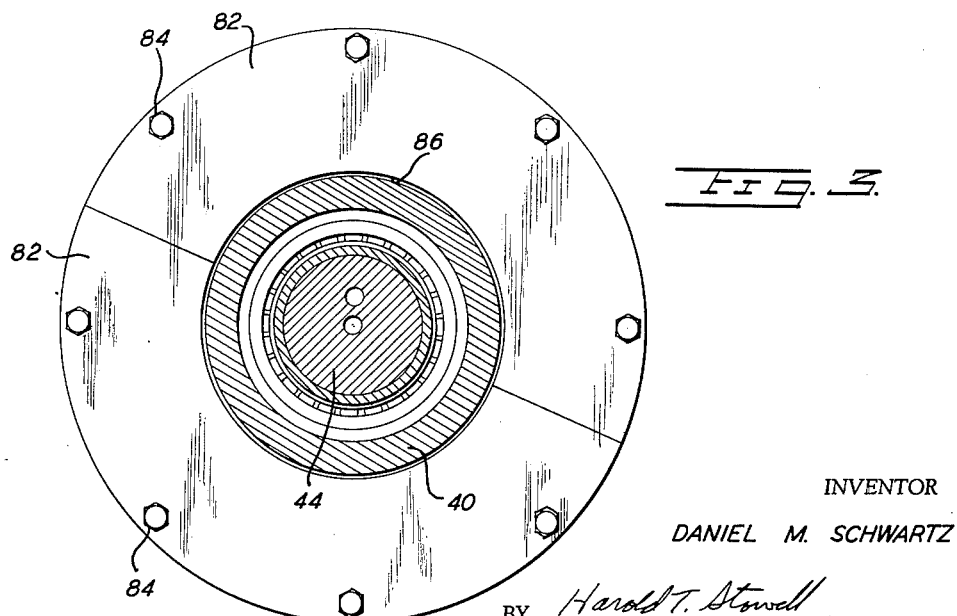
FIG. 3 is a section substantially on line 3—3 of FIG. 2.

The housing 48 also includes a radially extending plate member 82 which is secured to the annular member 76 by bolts 84 as more clearly shown in FIG. 3 of the drawings.

Referring to FIG. 3, the annular radially extending plate member 82 is preferably constructed of a pair of hemiannular elements. By employing a split plate 82, assembly, disassembly and repair of the transmission is greatly facilitated.

Referring specifically to FIG. 2 and FIG. 3 clearance is provided as at 86 to permit rotation of the clutch housing 48 independently of the gear 40. It has been found that satisfactory operation of the transmission is provided with a clearance of about 1/64 of an inch at this point. However, it will be apparent that this clearance is not particularly critical as the size of radial openings 88 and the number of such radial openings provided in the annular peripherally extending member 76 determine to a large extent how much oil may enter the housing between the plate 82 and the gear 40 without causing drag between the clutch discs. It will be seen that since the shaft 44 is continuously driven and the housing 48 for the clutch is secured to the shaft 44 any oil present or entering the housing 48 is forced, by centrifugal force, against the inner surface of the annular member 76 thence out of the radially extending openings 88. As long as the ingress of lubricating oil from the bearings, from the hydraulically actuated piston 50 and through the clearance opening 86 is less than the amount of oil that can be removed from the plural radially extending outlets 88 by centrifugal force of the rotation of the housing 48, the plural clutch plates of clutch 46 will be maintained in a substantially oil free state thus eliminating clutch drag when the piston is in the clutch release position.

Clutch housing 56, for friction clutch 54, is of identical construction to housing 48 and includes annular member 76′, radial wall 78′ which is secured to the shaft 44 at one end and to the annular member 76′ at the other end. The housing 56 also includes the radial annular plate member 82′ which is secured to the annular member 76′ by plural peripherally arranged bolts 84′. The plate 82′ is so mounted to the annular member 76′ of the housing 56 that a slight clearance 86′ is maintained between the inner edge of the plate 82′ and the gear 42. As hereinbefore described with reference to plate 82, plate 82′ may also be of split or hemi-annular construction.

From the foregoing description it will be seen the present invention provides a new and improved constant mesh change speed transmission having friction clutch type gear engaging means wherein the clutch drum is turning at all times the transmission is in operation so that centrifugal force is constantly in effect to evacuate any oil in the clutch cavity through radially extending openings in the periphery of the clutch drum whereby even though the clutch is operated partially submerged in an oil bath, the clutches freely release without annoying clutch drag.

Throughout the specification and claim, the term "oil" is intended to mean hydraulic fluids, lubricating fluids and the like of mineral, vegetable or synthetic origin or mixtures of such fluids.

Having described a preferred embodiment of my invention, what is claimed is:

A friction clutch assembly of the multiple-disc type, comprising coaxial driving and driven members, a housing continuously rotatable with the driving member, cooperating friction discs, alternate friction discs being rotatable with the driven member and with said housing, means for selectively engaging and disengaging said cooperating friction discs for coupling and uncoupling the driving and driven members of the assembly, a casing surrounding said assembly, said casing adapted to receive lubricant to a predetermined level, a portion of said housing and at least a portion of the rotatable members carried by the casing extending below the said predetermined lubricant level, said housing including a wall member surrounding a portion of the driven member and providing restricted clearance therebetween, lubricant outlet means in a peripheral wall of said housing whereby lubricant may be continuously removed from the housing through the peripheral outlet means at a rate substantially greater than the rate of entry of leakage lubricant from the casing into the housing through the restricted clearance so as to limit lubricant on the cooperating friction discs to a film and thereby substantially eliminate lubricant drag when the cooperating friction discs are disengaged.

References Cited in the file of this patent

UNITED STATES PATENTS

| | | |
|---|---|---|
| 1,138,098 | Fornaca | May 4, 1915 |
| 2,323,753 | Jaeger | July 6, 1943 |
| 2,610,719 | Hornbostel | Sept. 16, 1952 |
| 2,638,196 | Wilson | May 12, 1953 |
| 2,641,346 | Risk et al. | June 9, 1953 |
| 2,687,198 | Greenlee | Aug. 24, 1954 |
| 2,760,615 | Kershner | Aug. 28, 1956 |
| 2,775,328 | Yokel | Dec. 25, 1956 |
| 2,847,102 | Tiedman | Aug. 12, 1958 |

FOREIGN PATENTS

| | | |
|---|---|---|
| 150,301 | Great Britain | Oct. 7, 1920 |
| 537,063 | Canada | Feb. 12, 1957 |